United States Patent [19]

Calari et al.

[11] Patent Number: 5,621,199
[45] Date of Patent: Apr. 15, 1997

[54] RFID READER

[75] Inventors: Umberto Calari, Bologna, Italy; Mark C. Lampkin, Gross Pointe Farms, Mich.

[73] Assignee: Datalogic, Inc., Scotts Valley, Calif.

[21] Appl. No.: 415,853

[22] Filed: Apr. 3, 1995

[51] Int. Cl.$^6$ ..................................................... G06F 17/00
[52] U.S. Cl. ............................ 235/375; 235/491; 343/788
[58] Field of Search .................................... 235/375, 380, 235/491; 200/47, 302.1; 343/895, 788; 361/679; 340/572; 174/65 R, 65 G, 65 SS

[56] References Cited

U.S. PATENT DOCUMENTS

| | | | |
|---|---|---|---|
| 4,303,904 | 12/1981 | Chasek | 235/384 |
| 4,364,043 | 12/1982 | Cole et al. | 340/825.54 |
| 4,475,481 | 10/1984 | Carroll | 119/51 R |
| 4,656,463 | 4/1987 | Anders et al. | 340/572 |
| 4,827,115 | 5/1989 | Uchida et al. | 235/380 X |
| 4,918,296 | 4/1990 | Fujisaka et al. | 235/380 |
| 5,053,774 | 10/1991 | Schuermann et al. | 342/44 |
| 5,280,159 | 1/1994 | Schultz et al. | 235/382 |
| 5,281,855 | 1/1994 | Hadden et al. | 257/784 |
| 5,306,900 | 4/1994 | Metlitsky et al. | 235/462 |
| 5,335,541 | 8/1994 | Sharpe | 73/146.5 |
| 5,382,784 | 1/1995 | Eberhardt | 235/472 |
| 5,486,661 | 1/1996 | Jambor et al. | 200/47 |

FOREIGN PATENT DOCUMENTS

WO93/13494  7/1993  France ........................... G06K 7/08

Primary Examiner—Donald T. Hajec
Assistant Examiner—Steven Wigmore
Attorney, Agent, or Firm—Patrick T. King

[57] ABSTRACT

A compact rf reader apparatus integrated into a single compact package structure. In one embodiment, a rotatably adjustable head is mounted on the compact reader body portion containing read/write electronics and an interface controller. The rotatably adjustable head contains an antenna and is adapted to direct the antenna in numerous different directions without moving the compact reader body portion of the rf reader. Additionally, in one embodiment, the rf reader unit includes a switching power supply located within the reader body portion. The switching power supply is electrically coupled to the read/write electronics and the interface controller, and is synchronized with the transmitting frequency of the antenna to prevent interference.

20 Claims, 7 Drawing Sheets

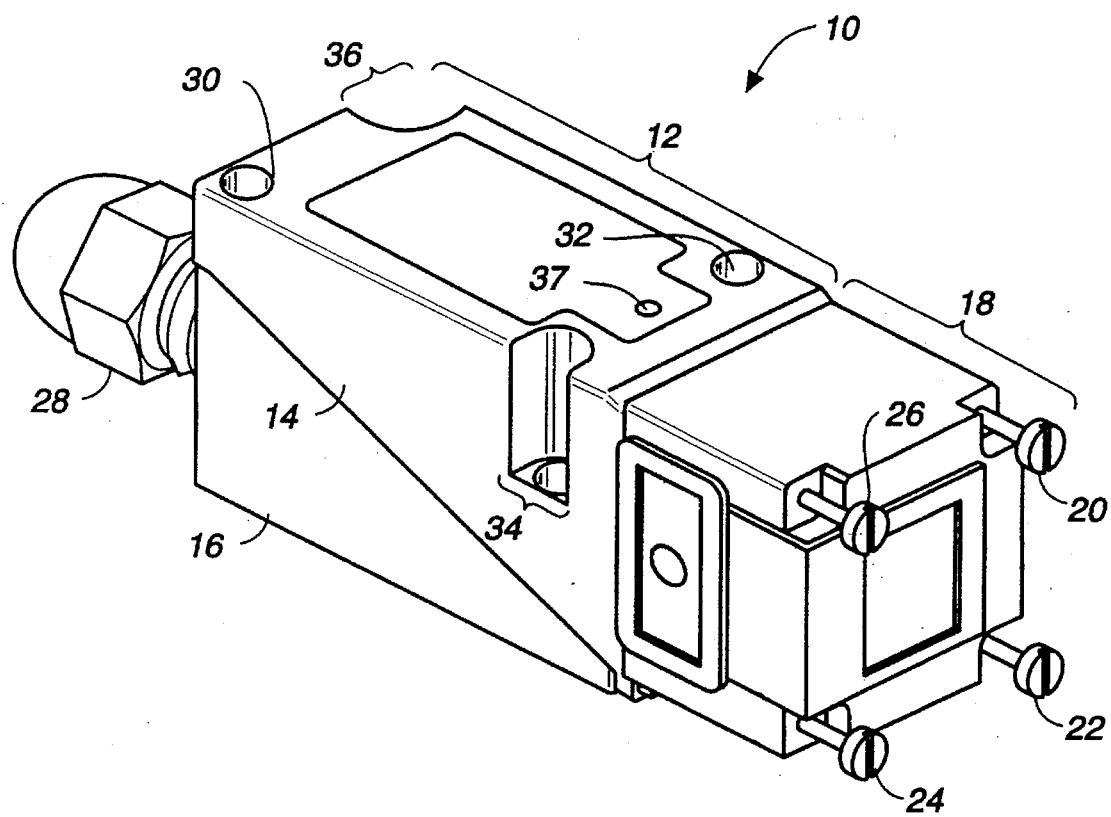
FIG._1

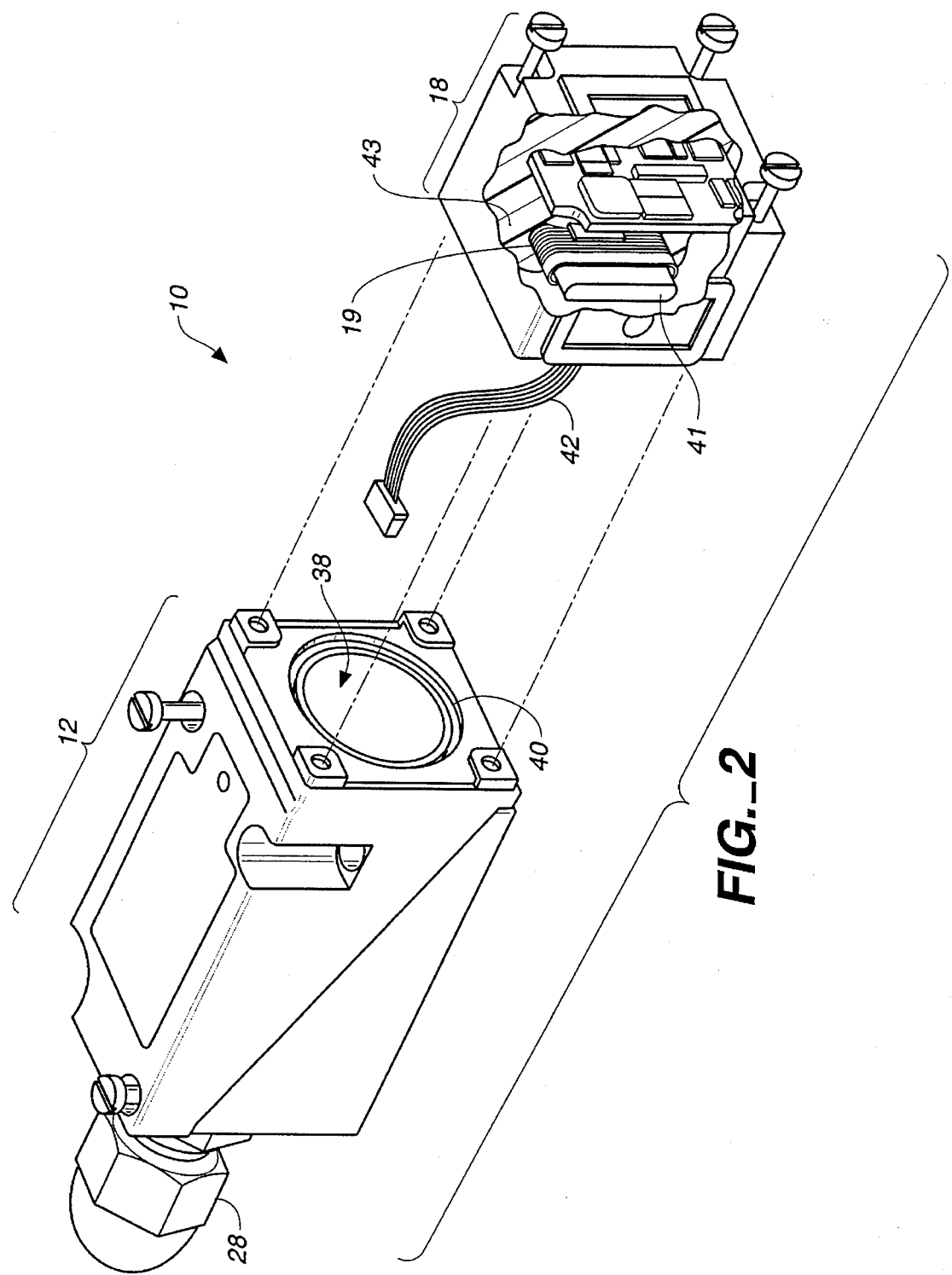
FIG._2

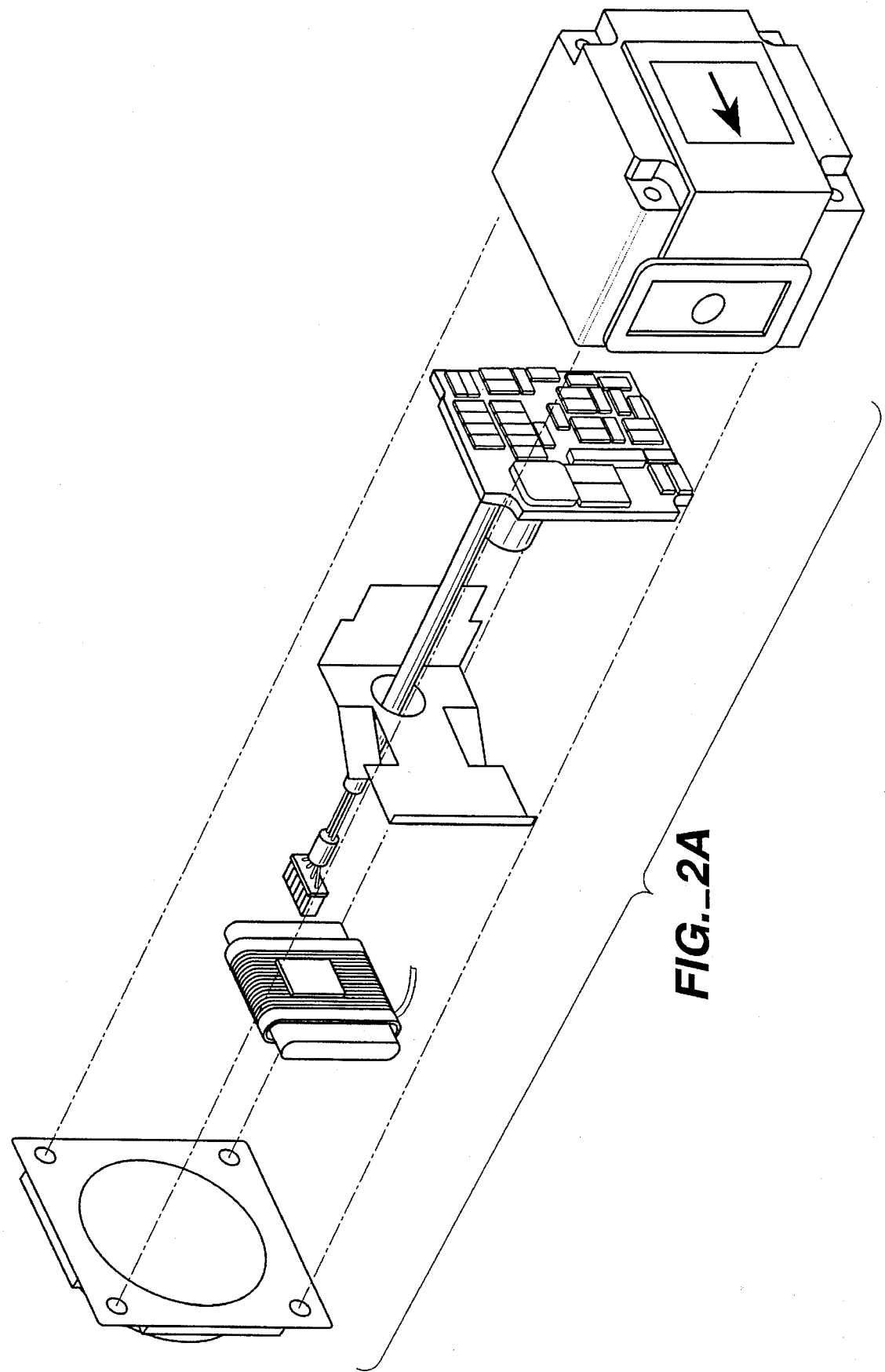
FIG._2A

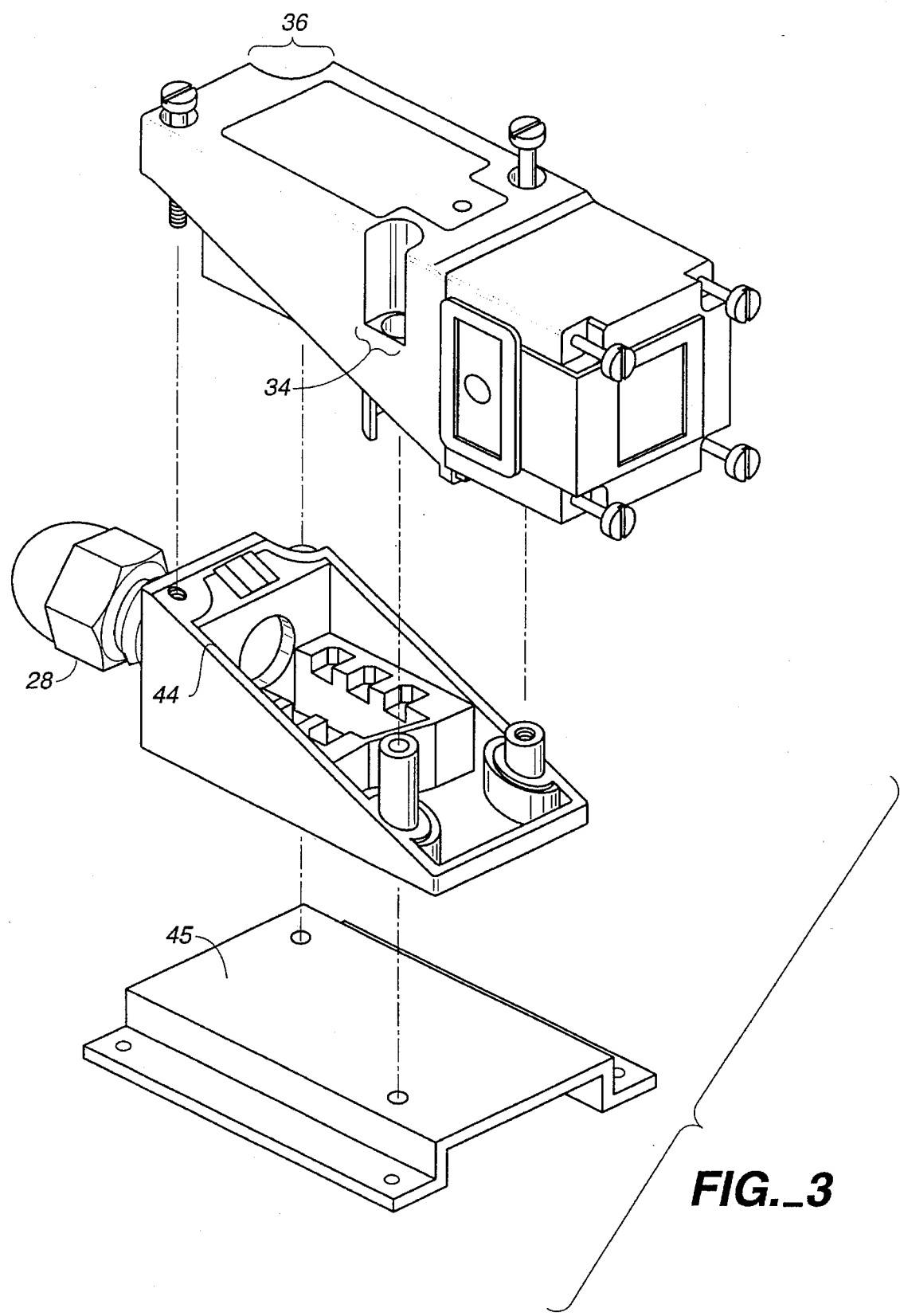
FIG._3

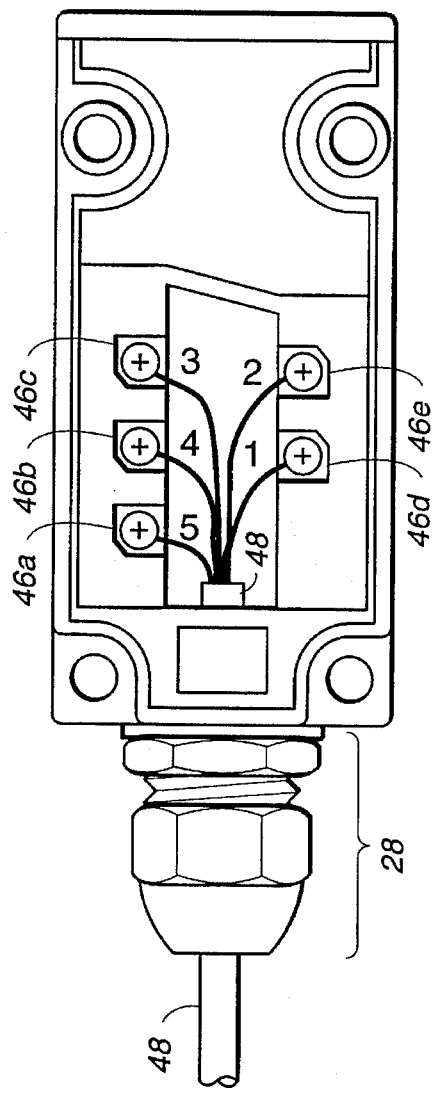
FIG._4
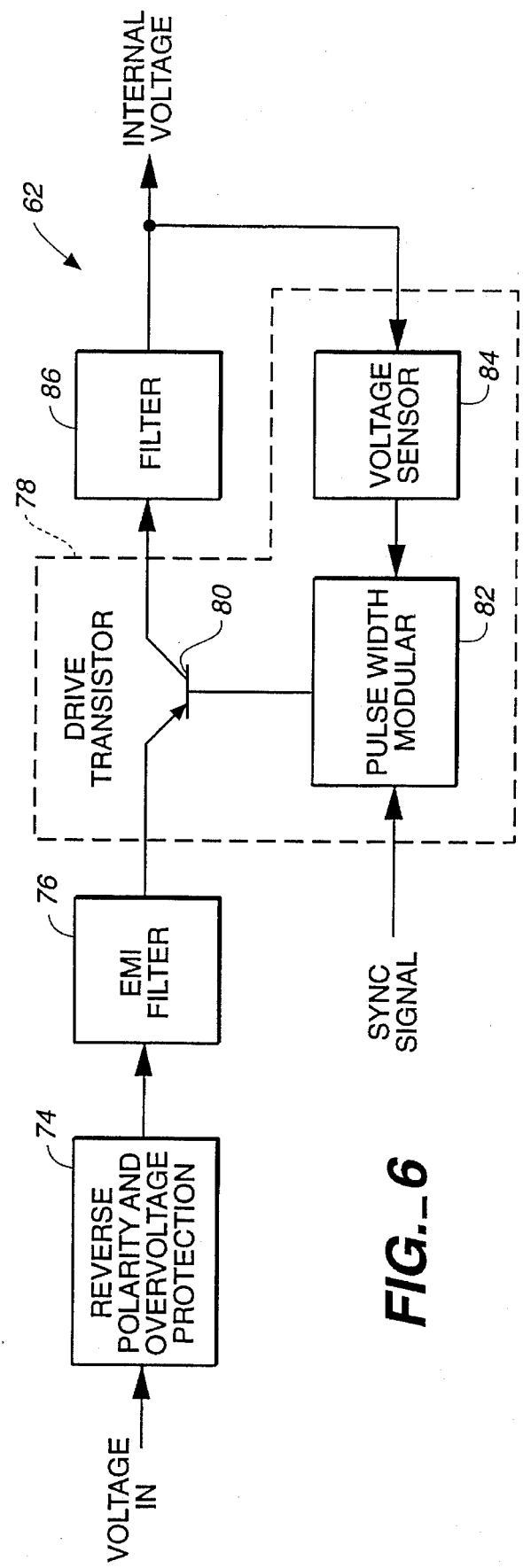
FIG._6

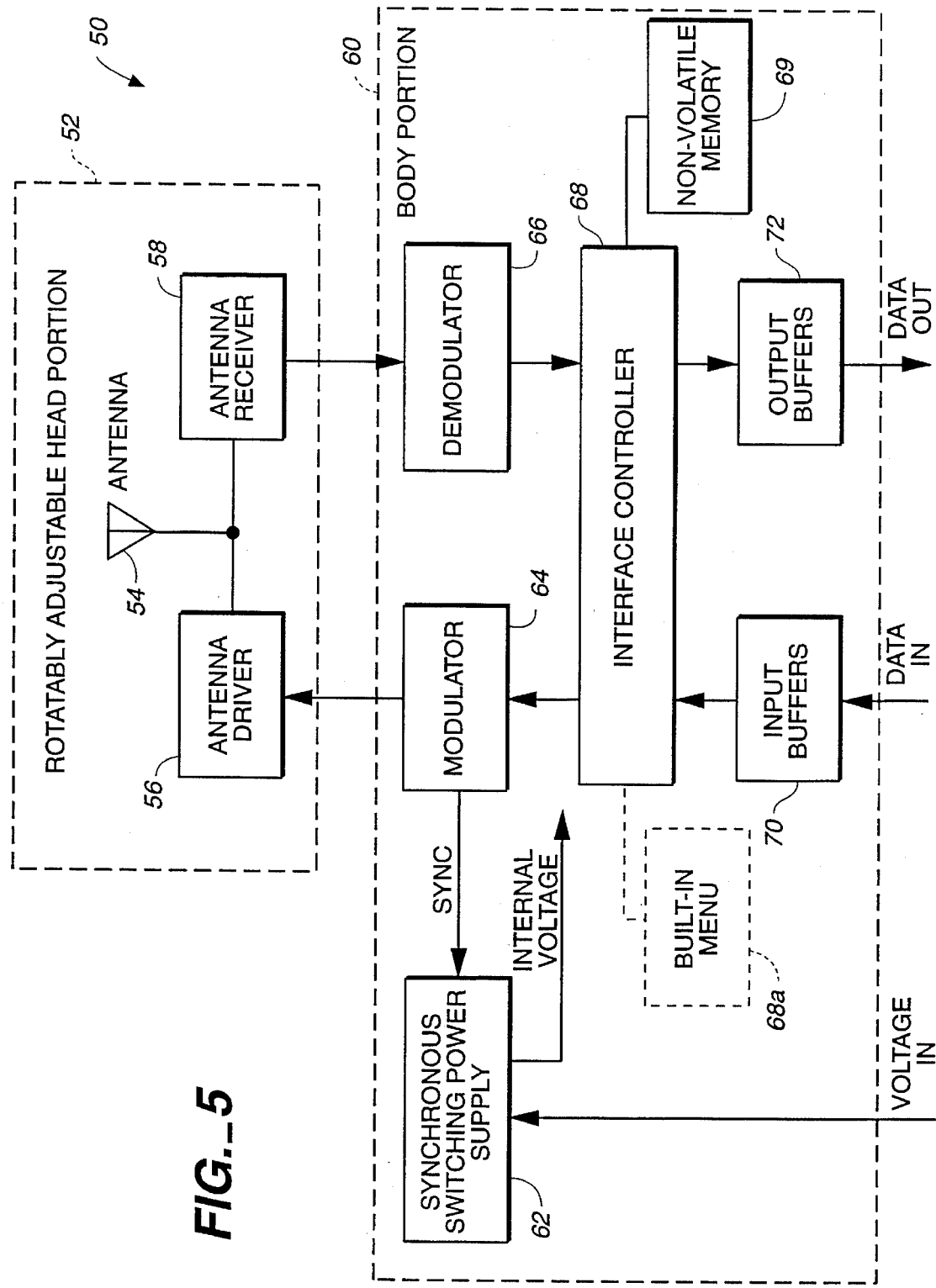
FIG._5

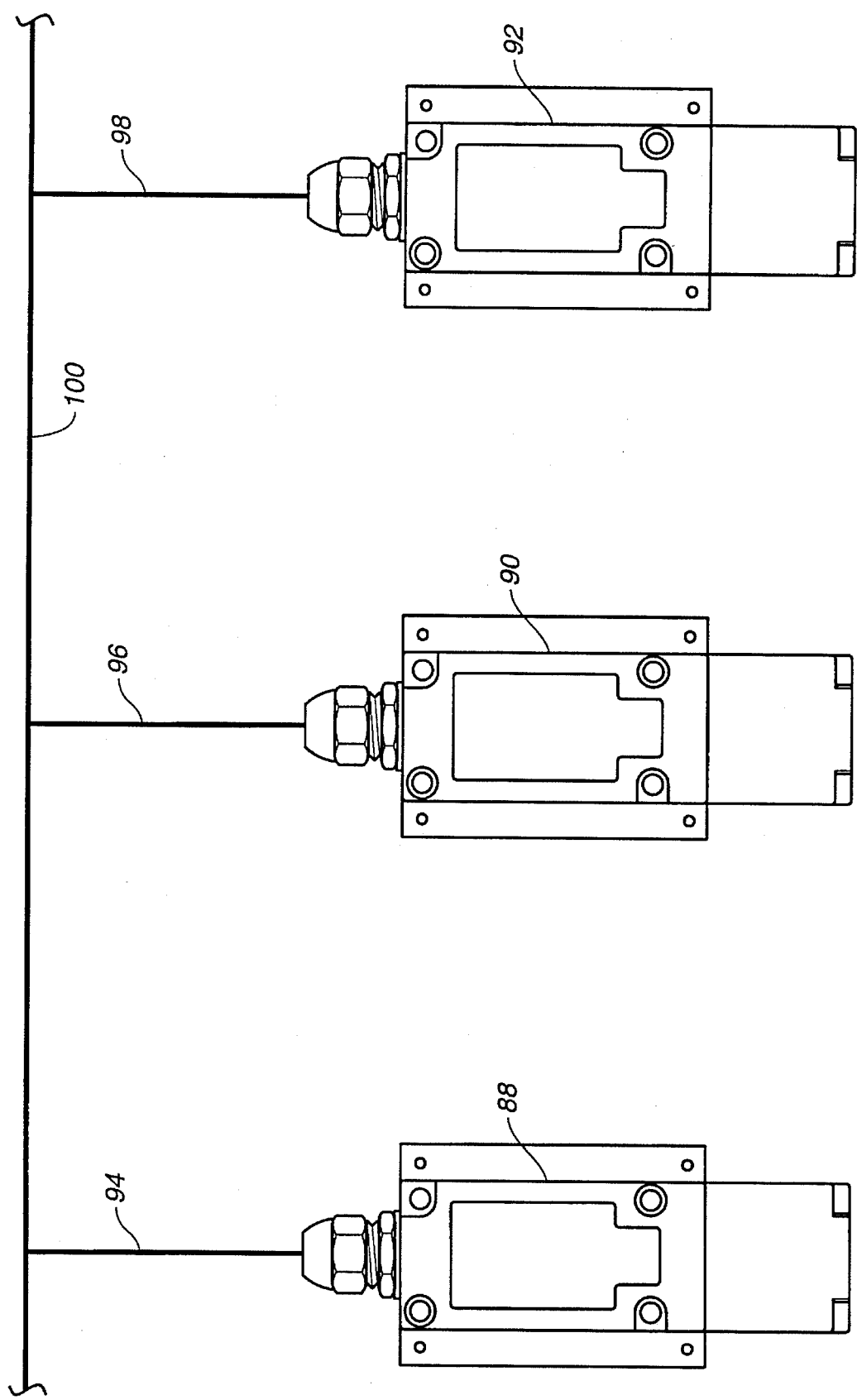
FIG._7

RFID READER

TECHNICAL FIELD

The present invention relates generally to identification readers and, more particularly, to rf readers

BACKGROUND ART

Rf readers are commonly used in industrial plants to identify and track items being manufactured. Typically, an rf tag is placed on an item to be monitored. The rf tag contains relevant data pertaining to and identifying the item. As the rf tag passes near the rf reader, a directional antenna emits rf signals in the range of 134 KHz towards the rf tag. The emitted rf signals induce an AC current in the rf tag. The AC current is used to "power-up" the rf tag thereby enabling the rf tag to transmit response signals from the rf tag back to the rf reader. The response signals typically contain the aforementioned relevant data pertaining to and identifying the tagged item.

Commonly, rf readers are placed on standard mountings built into the manufacturing facility. These standard mountings are located throughout the manufacturing facility wherever monitoring devices may be needed. Often, the mountings require that the rf reader be placed into tightly cramped locations. Thus, conventional rf readers are separated into two distinct portions, a uni-directional antenna portion and the read/write electronics portion. The two distinct portions of the rf reader are connected to each other by, for example, a cable or other extended electrical connector. Such cable or other extended electrical connectors crowd the manufacturing environment, serve as a source of power loss, and are a source of electrical noise. In addition to the noise generated by cable or other extended electrical connectors, noise is also generated by the reader power supply. The generated noise can make it difficult to clearly receive response signals transmitted by the tagged item.

In addition to the problems associated with cables or other extended electrical connectors, in many instances, due to the placement of the standard mountings, numerous uni-directional antennas must be located near the path of the of the item to be monitored. That is, because the antenna portion is attached to standard mountings, the uni-directional antenna may not always be focused directly towards the path of the tagged item. Thus, in order to insure that the rf tag on the item is incident with the rf signals emitted from the antenna, several antennae are located on numerous respective standard mountings near the path of the tagged item. As a result, the cost of such an rf monitoring system is increased, and the amount of valuable manufacturing space required for such a system is also increased.

Furthermore, many conventional rf reader units contain numerous switches and buttons for programming and setting operating parameters of the rf reader unit. The buttons and switches further limit the rf reader mounting position possibilities. Additionally, the buttons and switches further increase the size of the rf reader unit and limit the extent to which the size of the read/write electronics can be reduced.

Consequently, the need has arisen for an rf reader unit which can be placed in a cramped location, which can be disposed on standard mountings, which does not suffer from power loss or electrical noise due to a cable or other type of extended electrical connection between the antenna portion and the read/write electronics portion, which does not generate noise which interferes with response signals from the tagged item, which is able to be focused towards the path of a tagged item without requiring numerous additional rf reader units, and which does not require numerous buttons and switches to program and set operating parameters for the rf reader unit.

DISCLOSURE OF THE INVENTION

It is, therefore, an object of the present invention to provide an rf reader unit which can be placed in a cramped location, which can be disposed on standard mountings, which does not suffer from power loss or electrical noise due to a cable or other type of extended electrical connection between the antenna portion and the read/write electronics portion, which does not generate noise which interferes with response signals from the tagged item, which is able to be focused towards the path of a tagged item without requiring numerous additional rf reader units, and which does not require numerous buttons and switches to program and set operating parameters for the rf reader unit. The above object has been achieved by a compact rf reader having a rotatably adjustable antenna mounted to body portion to form a single integrated unit. The present invention further includes built-in system electronics for programming and setting operating parameters of the rf reader unit, thereby eliminating the need for numerous exterior buttons and switches.

In one embodiment of the present invention, a body portion containing read/write electronics and a head assembly containing an antenna are integrated into a single compact structure. The head assembly containing the antenna is rotatably attached to the body portion with an O-ring to provide a liquid-tight seal between the head and body portions. The entire rf reader unit is also liquid-tight thereby rendering the present invention well suited for use in harsh climates such as, for example, manufacturing facilities. Furthermore, the present invention is configured with mounting holes which mate with standard mountings built into manufacturing facilities.

The present invention also includes an opening for receiving an interfacing cable into the rf reader. The opening is surrounded by a gland nut such that the connection between the rf reader and the interfacing cable is liquid-tight. Additionally, the present invention includes a switching power supply which is synchronized with the transmitting frequency of the antenna to eliminate noise which might interfere with the response signals transmitted from the tagged item. In the present embodiment, the rf reader unit is adapted to being connected to a multi-drop bus such that a plurality of rf reader units can be controlled using a single controlling system. Also, the present invention includes non-volatile memory for storing configuration parameters of the rf reader unit.

BRIEF DESCRIPTION OF THE DRAWINGS

The accompanying drawings which are incorporated in and form a part of this specification, illustrate embodiments of the invention and, together with the description, serve to explain the principles of the invention:

FIG. 1 is a perspective view of an rf reader having a rotatably adjustable head mounted to a body portion in accordance with the present invention.

FIG. 2 is a perspective, partially cut-away view of the rf reader of FIG. 1 with its rotatably adjustable head portion extracted from its body portion to expose the liquid-tight O-ring assembly contained therein in accordance with the present invention.

FIG. 3 is a perspective view of the rf reader of FIG. 1 with the upper and lower halves of the body portion separated to expose a gasket located between the two halves in accordance with the present invention.

FIG. 4 is a top view of the rf reader of FIG. 1 with the upper half and the rotatably adjustable head portion removed therefrom to expose interior screw terminals located in the bottom half of the body portion in accordance with the present invention.

FIG. 5 is a schematic diagram of the antenna circuitry and the read/write electronics circuitry in accordance with the present invention.

FIG. 6 is a more detailed schematic diagram of the synchronous switching power supply of FIG. 5 showing various components of the synchronous switching power supply in accordance with the present invention.

FIG. 7 is a schematic view of multiple rf readers attached via respective interfacing cables to a wire bus in accordance with the present invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

With reference now to FIGS. 1, a perspective view of the rf reader 10 of the present invention is shown. As shown in FIG. 1, rf reader 10 has a body portion 12 formed of two halves, upper half 14 and lower half 16, and a head portion 18. Body portion 12 contains read/write electronics, while head portion 18 contains an antenna 19. Rf reader 10 also contains a gland nut 28 for providing a liquid-tight seal between an interfacing cable, not shown, and an opening, not shown, in body portion 12 for receiving the interfacing cable.

In the present embodiment, head portion 18 is attached to body portion 12 using screws 20, 22, 24, and 26. Although screws 20, 22, 24, and 26 are used in the present embodiment, the present invention is also well suited to the use of numerous other types of attachment devices or methods. Head portion 18 is rotatably mounted to body portion 12 in the present embodiment. That is, when screws 20, 22, 24, and 26 are loosened, head portion 18 can be rotated in 90 degree increments to focus the antenna towards a desired direction. After rotatably adjustable head portion 18 has been placed in the desired position, screws 20, 22, 24, and 26 are tightened to hold rotatably adjustable head portion 18 firmly in its desired fixed position. In addition to directing the antenna outward, the present invention is also well suited to transmitting and receiving signals through the top of rotatably adjustable head portion 18. In so doing, the present invention further increases the possible areas with respect to body portion 12 which can be covered by the antenna. Therefore, the antenna of the present invention is able to be directed in almost any direction regardless of the position in which the rf reader is mounted.

Two screws 30 and 32 are used to hold upper half 14 and lower half 16 of rf reader 10 together. By unfastening screws in holes 30 and 32, upper half 14 can be easily detached from lower half 16, thereby providing easy access to the interior of body portion 12. In the present embodiment, rf reader 10 is completely liquid-tight. That is, upper and lower halves 14 and 16 have a liquid-tight seal therebetween. Likewise, rotatably adjustable head portion 18 is sealed in a liquid-tight manner to body portion 12. Thus, rf reader 10 of the present invention is impervious to liquids such as oil, water, cutting fluids, and the like. Therefore the present invention is well suited to use in harsh climates such as, for example, manufacturing facilities. Rf reader 10 also includes an indicator light 37.

In the present embodiment, indicator light 37 is used to indicate the activity status and the current configuration parameters of the rf reader unit. Furthermore, rf reader 10 includes attachment holes 34 and 36 for attaching the rf reader 10 to a standard mountings. As a result, the present invention is well suited to use in conventional manufacturing facilities having standard mountings built therein.

With reference next to FIG. 2, a perspective view of rf reader 10 is shown with rotatably adjustable head portion 18 extracted from body portion 12 to expose O-ring 40. A wire-wrapped ferrite antenna 41 is contained within rotatably adjustable head 18 and is connected to body portion 12 via a circular access hole 38. O-ring 40 disposed around access hole 38 is formed of a material which, when compressed by attaching rotatably head 18 to body portion 12, prevents liquid from entering hole 38. A short internal electrical connector 42 is disposed within access hole 38 to electrically connect antenna circuitry within rotatably adjustable head 18 to read/write electronics circuitry within the body portion 12. By using O-ring assembly 40 the liquid-tight seal is maintained regardless of the orientation of rotatably adjustable head 18 with respect to body portion 12. As shown in FIG. 2, the wire-wrapped ferrite antenna 41 is securely potted in place within the rotatable adjustable head assembly 18 using a potting material 43.

Referring now to FIG. 3, a perspective view of rf reader 10 is shown with upper and lower halves 14 and 16 separated to expose gasket 44. As with O-ring assembly 40 of FIG. 2, gasket 44 is formed of a material which, when compressed by attaching upper half 14 to lower half 16, prevents liquid from passing between the two halves 14 and 16 and into the interior of rf reader 10. Therefore, as a result of gland nut 28, gasket 44, and O-ring assembly 40 of FIG. 2, rf reader 10 is completely liquid-tight.

FIG. 3 shows a standard mounting 45 for a wall. The attachment holes 34, 36 which are shown and discussed in connection with FIG. 1, are conveniently used to attach the rf reader 10 to mounting 45 using mounting screw (not shown).

With reference next to FIG. 4, a top view of rf reader 10 is shown with upper half 14 and rotatably adjustable head portion 18 removed therefrom to expose interior screw terminals 46a–46e. As shown in FIG. 4, an interfacing cable 48 is routed through liquid-tight gland nut 28 and into the interior of rf reader body portion 12. Individual wires within interfacing cable 48 are attached to respective screw terminals 46a–46e. Screw terminals 46a–46d are electrically connected to the read/write electronics of rf reader 10. By using screw terminals, the present invention eliminates the need to solder or use other complicated attachment methods to form electrical connections between interfacing cable 48 and the read/write electronics. Thus, the present invention is "user-friendly" allowing for easy on-site installation and repairs.

Referring now to FIG. 5, a schematic diagram 50 of the antenna circuitry 52 and the read/write electronics circuitry 60 is shown. In the present embodiment, antenna circuitry 50 is comprised of an antenna coil 54, an antenna driver 56 and an antenna receiver 58. Thus, the rf reader communicates with an rf tag via rf antenna 54. When transmitting to the rf tag, antenna driver 56 is employed. Likewise, when receiving response signals from the rf tag, antenna receiver 58 is used. In the present embodiment, rf antenna 54 is formed of wire-wrapped ferrite which is securely "potted" or mounted within rotatably adjustable head assembly 18 of FIG. 1.

As shown in FIG. 5 reader body circuit 60 is comprised of a synchronous switching power supply 62, a transmit modulator 64, a receive demodulator 66, an interface controller 68, with a built-in menu 68a, a non-volatile memory 69, input buffers 70, and output buffers 72. Modulator 64 is electrically coupled to antenna driver 56. Demodulator 66 is coupled to antenna receiver 58. Thus, in the present embodiment, in response to data coming into input buffers 70, the interface controller 68 activates modulator 64 to produce an interrogation signal. The interrogation signal is transferred through antenna driver 56 to antenna coil 54. The interrogation is then transmitted to the rf tag. When response signals are received, they are routed through antenna receiver 58, to demodulator 66, to interface controller 68 and out through output buffers 72.

In the present invention, because antenna circuitry 52 and read/write electronics circuitry 60 are integrated into a single, compact structure, no extended electrical connections are required between antenna circuitry 52 and read/write electronics circuitry 60. As a result, the present invention does not suffer from significant power loss or electrical noise during the transfer of signals between antenna circuitry 52 and read/write electronics circuitry 60 as found in conventional two-piece rf reader units.

With reference next to FIG. 6, a more detailed schematic diagram of synchronous switching power supply 62 is shown. As shown in FIG. 6, synchronous power supply 62 consists of a reverse polarity and over-voltage protection circuit 74 which protects the read/write electronics circuitry against incorrect wiring of the voltage input, and protects read/write electronics 60 from high voltage transients. The input voltage is passed from reverse polarity and over-voltage protection circuit 74 through an EMI filter 76 which keeps internally generated voltage spikes from being conducted back out the Voltage In signal wire. A switching power supply circuit 78 such as, for example, an SGS-Thomson L4972A switching regulator, containing a drive transistor 80, a pulse width modulator 82, and a voltage sensor 84, produces a regulated output voltage which is filtered by filter 86 and which functions as the internal voltage for read/write electronics 60. Specifically, voltage sensor 84 of switching power supply circuit 78 samples the output voltage, or "internal voltage" to determine whether the internal voltage is higher or lower than the desired value. Voltage sensor 84 controls pulse width modulator 82 which, in turn, varies the duty cycle of the switching pulse. The switching pulse turns on and off a pass through p-n-p transistor 80 which meters the amount of energy transferred to filter 86.

In the present embodiment, antenna driver 56 generates an interrogation signal which is transmitted from rf antenna 54 at a frequency of approximately 134 KHz. Response signals from the rf tag are received at a frequency of approximately 33.5 KHz. Thus, random voltage spikes or noise generated by a power supply of a conventional rf reader can obscure or mask response signals. However, in the present embodiment, a sync signal is supplied to switching power supply circuit 78 by modulator 64 of FIG. 5. The sync signal causes any switching transients to occur coincident with the interrogation frequency. Because the switching transients occur at a precise frequency as opposed to a randomly varying frequency, the transients can be filtered out by a filter with fixed components and a fixed notch frequency. Additionally, because the frequency is synchronous with the transmitting frequency of rf antenna 54 of FIG. 1, there are no inter-modulation products. Thus, the present invention eliminates or substantially reduces random intermodulation by-products and noise found in conventional rf reader units.

Referring now to FIG. 7, a schematic view of multiple rf readers 88, 90, and 92 attached via respective interfacing cables 94, 96, and 98 to a wire bus 100 is shown. Employing a wire bus 100 eliminates the need to separately wire each of multiple rf readers 88, 90, and 92 to a central controller. Instead of having multiple individual connections, wire bus 100 provides a single connection from the central controller to numerous rf reader units, thereby saving wire, connectors, space, and installation labor. Thus, the present invention is well suited to use in manufacturing facilities where numerous rf readers may be disposed at various locations. Instead of having numerous wire connections, a single bus line can facilitate the numerous rf readers wherever located within the manufacturing facility. Likewise, instead of having a separate central controller for each rf reader or for selected groups of rf readers, the present invention allows numerous distantly-located rf readers to be controlled using a single central controller.

The read/write electronics of the present invention also includes a built-in menu and non-volatile memory for storing the configuration parameters of the rf reader unit. By having a built-in menu programmed into, for example, interface controller 68 of FIG. 5, the present invention allows a user at a central controller station to select and implement desired operating configuration parameters of the rf reader unit. Thus, the rf reader of the present invention does not require the numerous programming button and switches found on conventional rf readers. As a result, the size of the present invention can be reduced to an extent not possible with conventional rf readers. Additionally, by containing non-volatile memory, the configuration parameters of the rf reader unit remain stored in the read/write electronics even if power is lost.

Thus, the present invention provides an rf reader unit which has both the antenna-containing head portion and the read/write electronics-containing body portion integrated into a single, compact, structure. The compact size of the present invention allows the rf reader to be placed into cramped locations which are to small for conventional rf reader units. The present invention is also adapted to fit on standard mountings. However, the rotatably adjustable head portion of the present invention allows the antenna contained therein to be focused in almost any direction regardless of the position in which the rf reader is mounted. As a result, the present invention eliminates the requirement for numerous additional rf reader units to obtain desired antenna coverage. Furthermore, by having the antenna-containing head portion and the read/write electronics-containing body portion integrated into a single, compact, structure, the present invention does not require a cable or other type of extended electrical connection between the antenna portion and the read/write electronics portion. Thus, the present invention does not suffer from power loss or electrical noise due to extended electrical connections between the antenna portion and the read/write electronics portion. By using a synchronized switching power supply, the present invention does not generate noise which interferes with response signals from the tagged item. Also, by having a built-in menu and non-volatile memory, the present invention does not require numerous buttons and switches to program, set, and store operating parameters for the rf reader unit.

The foregoing descriptions of specific embodiments of the present invention have been presented for the purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

We claim:

1. A stationary rf reader unit comprising:
   an rf reader including an rf antenna,
   a stationary compact reader body portion, said compact reader body portion containing read/write electronics and an interface controller therein, wherein said stationary compact reader body portion is adapted to be mounted on standard identification reader wall mounts, and
   a rotatably adjustable head mounted to said stationary compact reader body portion such that an rf reader unit is comprised of a single integrated structure, said rotatably adjustable head containing said rf antenna therein and adapted to direct said rf antenna towards a plurality of different directions without moving said stationary compact reader body portion, wherein said rotatably adjustable head is further adapted to being fixed in a selected position such that said rf antenna remains focused in a desired direction.

2. The stationary rf reader unit of claim 1 wherein said stationary rf reader further includes a switching power supply disposed within said compact reader body portion and electrically coupled to said read/write electronics and said interface controller.

3. The stationary rf reader unit of claim 2 wherein said switching power supply is synchronized with the transmitting frequency of said rf antenna.

4. The stationary rf reader unit of claim 1 wherein said rf antenna is further comprised of wire-wrapped ferrite.

5. The stationary rf reader unit of claim 4 wherein said wire-wrapped ferrite rf antenna is securely potted within said rotatably adjustable head assembly.

6. The stationary rf reader unit of claim 1 wherein said stationary rf reader unit is liquid-tight.

7. The stationary rf reader unit of claim 1 wherein said rf reader further includes an O-ring seal between said rotatably adjustable head and said stationary compact reader body portion such the connection between said rotatably adjustable head and said compact reader body portion is liquid-tight.

8. The stationary rf reader unit of claim 1 wherein said compact reader body portion further includes an opening for receiving an interfacing cable into said stationary compact reader body portion.

9. The stationary rf reader unit of claim 8 wherein said stationary rf reader further includes a gland nut surrounding said opening for receiving said interfacing cable such the connection between said compact reader body portion and said interfacing cable is liquid-tight.

10. The stationary rf reader unit of claim 8 wherein said compact reader body portion further contains screw terminals therein for electrically connecting said interfacing cable to said read/write electronics and said interface controller.

11. The stationary rf reader unit of claim 1 wherein said interface controller further includes a built-in menu system for selecting product features of said rf reader unit.

12. The stationary rf reader unit of claim 1 wherein said rf reader is adapted to being connected to a multi-drop bus such that a plurality of said rf reader units can be controlled using a single controlling system.

13. The stationary rf reader unit of claim 1 wherein said interface controller further includes non-volatile memory for storing configuration parameters of said rf reader unit.

14. A stationary compact rf reader unit integrated into a single package structure comprising:
   an rf reader including an rf antenna,
   a stationary reader body portion, said stationary reader body portion containing read/write electronics and an interface controller therein, said stationary reader body portion further including an opening for receiving an interfacing cable into said stationary reader body portion, said stationary reader body portion further containing screw terminals therein for electrically connecting said interfacing cable to said read/write electronics and said interface controller, wherein said stationary reader body portion is adapted to be mounted on standard identification reader wall mounts,
   a gland nut surrounding said opening for receiving said interfacing cable such the connection between said stationary reader body portion and said interfacing cable is liquid-tight,
   a rotatably adjustable head mounted to said stationary reader body portion, said rotatably adjustable head containing said rf antenna therein and adapted to direct said rf antenna towards a plurality of different directions without moving said stationary reader body portion, wherein said rotatably adjustable head is further adapted to being fixed in a selected position such that said rf antenna remains focused in a desired direction,
   an O-ring seal disposed between said rotatably adjustable head and said stationary reader body portion such that the connection between said rotatably adjustable head and said stationary reader body portion is liquid-tight, and
   a switching power supply electrically disposed within said stationary reader body portion and coupled to said read/write electronics and said interface controller.

15. The stationary rf reader unit of claim 14 wherein said switching power supply is synchronized with the transmitting frequency of said rf antenna.

16. The stationary rf reader unit of claim 14 wherein said rf antenna is further comprised of wire-wrapped ferrite.

17. The stationary rf reader unit of claim 16 wherein said wire-wrapped ferrite rf antenna is securely potted within said rotatably adjustable head assembly.

18. The stationary reader unit of claim 14 wherein said interface controller further includes a built-in menu system for selecting product features of said rf reader unit.

19. The stationary rf reader unit of claim 14 wherein said stationary rf reader is adapted to being connected to a multi-drop bus such that a plurality of said rf reader units can be controlled using a single controlling system.

20. The stationary rf reader unit of claim 14 wherein said interface controller further includes non-volatile memory for storing configuration parameters of said rf reader unit.

* * * * *